US006400397B1

(12) United States Patent
Maurel

(10) Patent No.: US 6,400,397 B1
(45) Date of Patent: Jun. 4, 2002

(54) METHOD OF PUNCHING A FLAT CABLE

(75) Inventor: Frédéric Maurel, Montmirail (FR)

(73) Assignee: Axoral, Mecringes (FR)

( * ) Notice: Subject to any disclaimer, the term of this patent is extended or adjusted under 35 U.S.C. 154(b) by 0 days.

(21) Appl. No.: 09/467,557

(22) Filed: Dec. 20, 1999

(30) Foreign Application Priority Data

Dec. 21, 1998 (JP) ............................................ 98 16141

(51) Int. Cl.[7] .................................................. H04N 7/18

(52) U.S. Cl. ............................. 348/87; 348/86; 348/94; 348/95

(58) Field of Search ......................... 348/86–87, 94–95, 348/125–126, 133–134; 382/141, 145, 147, 151–152; 439/192, 492, 894

(56) References Cited

U.S. PATENT DOCUMENTS 3,677,116 A 7/1972 Berg et al. ..................... 83/55
3,924,923 A * 12/1975 Shoemaker ................. 439/894
4,742,746 A * 5/1988 Olsson ........................ 83/387
4,829,375 A 5/1989 Alzmann et al. ............. 348/87
5,417,134 A 5/1995 Fitz, Jr. ....................... 83/446

* cited by examiner

*Primary Examiner*—Vu Le
(74) *Attorney, Agent, or Firm*—Wolf, Greenfield & Sacks, P.C.

(57) ABSTRACT

The invention relates to a method of punching a flat cable having at least one conductor zone defining laterally at least one intermediate empty zone whose midplane is designed to contain the fixed punch axis wherein the cable is caused to pass flat through a lateral guide while using a video system coupled to a computer to monitor the position relative to the punch axis of a reference plane situated in the conductor zone, and it is compared with a reference value corresponding to the ideal position for the reference plane relative to the midplane of the intermediate empty zone so as to measure the offset of the zone relative to the punch axis, thereafter the cable is displaced transversely and automatically through a distance corresponding to the offset as measured by the computer so as to cause the midplane of the empty zone to coincide with the punch axis, and then the cable is punched in this position.

7 Claims, 2 Drawing Sheets

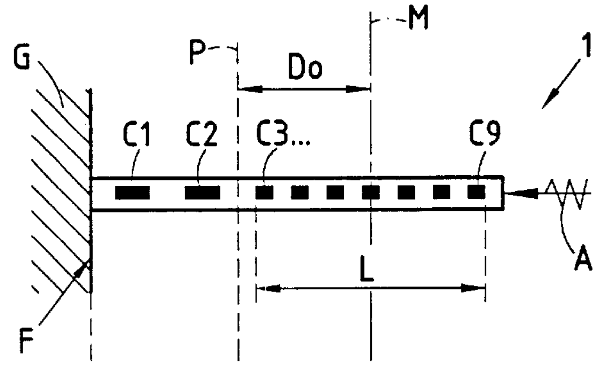
FIG.3A
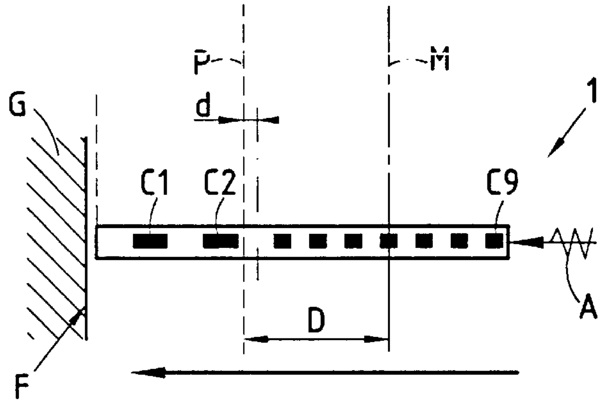
FIG.3B
FIG.4
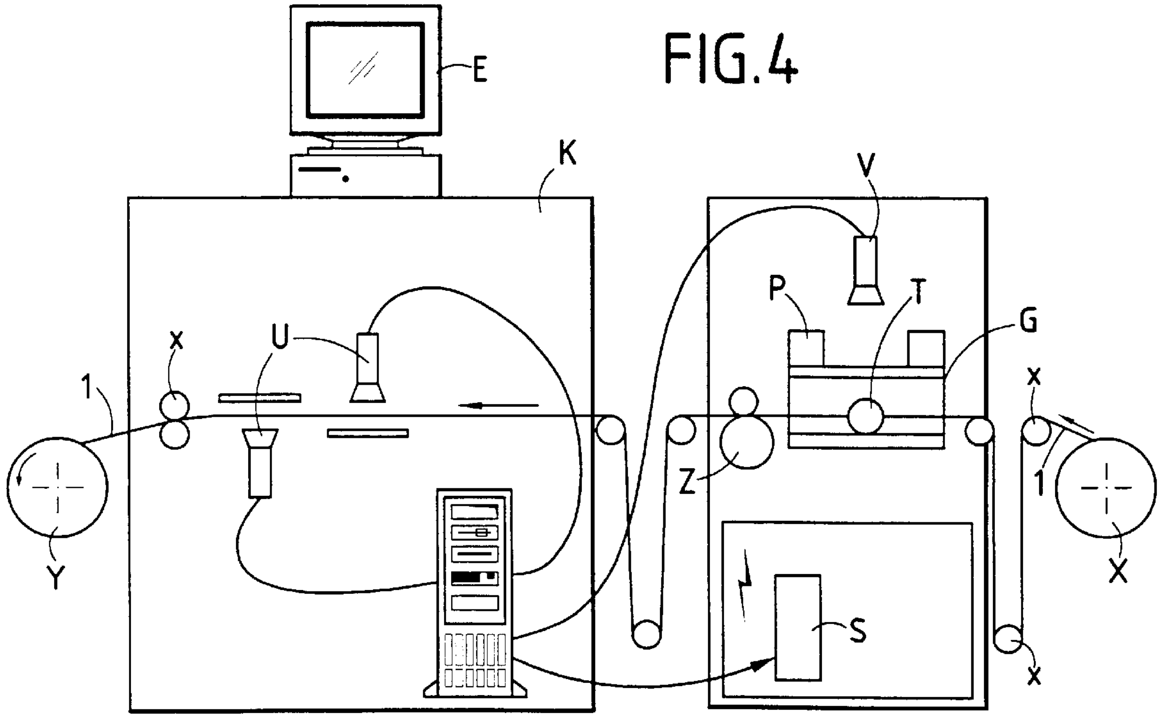

METHOD OF PUNCHING A FLAT CABLE

The present invention relates to a method of punching a flat cable.

BACKGROUND OF THE INVENTION

In general, flat cables comprise at least one conductor zone defining the side of an empty intermediate zone whose midplane is designed to contain the punch axis; the diameter of the punch being as a general rule smaller than the width of said empty zone.

Such punching is intended to provide orifices for use as positioning references for subsequent operations of automatically soldering the cable to auxiliary electrical or electronic members such as connectors, circuits, . . .

Traditionally, a flat cable is punched by placing it so that one of its lateral edges presses against a flank that is secured to a fixed reference guide.

Where appropriate, a second flank placed facing the first provides resilient thrust against the other lateral edge of the cable so as to compensate for possible variations in width.

Nevertheless, the position of the midplane of the empty zone depends closely on the lateral positioning of the conductor zone and that is not completely unvarying along the length of the cable because of the manufacturing tolerances accepted for its margin, whereas the position of the punch axis is always unchanging since it is associated with the position of the tool.

Lateral offsets in the midplane of the intermediate empty zone can therefore give rise to punching faults where punching takes place in a position that is offset from the midplane of the empty zone.

Thus, it is not possible for traditional methods to avoid damaging the conductor zone during punching, and that very seriously comprises the quality of the cable.

Furthermore, subsequent operations of connecting the cable to auxiliary electrical members which make use of the orifices that result from the punching as reference points can lead to short circuits, and although they can be avoided by then performing manual adjustment operations, that is laborious and expensive.

OBJECTS AND SUMMARY OF THE INVENTION

An object of the present invention is to resolve the technical problems posed by traditional punching methods by causing the axis of the punch tool to coincide with the midplane of the intermediate empty zone regardless of its dimensions and of its position on the cable.

According to the invention, this object is achieved by means of a method of punching a flat cable having at least one conductor zone defining laterally at least one intermediate empty zone whose midplane is designed to contain the fixed punch axis, wherein:

- the cable is caused to pass flat through a lateral guide while using a video system coupled to a computer to monitor the position relative to the punch axis of a reference plane situated in the conductor zone, and it is compared with a reference value corresponding to the ideal position for said reference plane relative to the midplane of the intermediate empty zone so as to measure the offset of said zone relative to the punch axis;
- thereafter the cable is displaced transversely and automatically through a distance corresponding to the offset as measured by the computer so as to cause the midplane of the empty zone to coincide with the punch axis; and then
- the cable is punched in this position.

In a specific implementation, the reference plane is selected as being the midplane of the conductor zone.

According to an advantageous characteristic, the cable is displaced transversely by controlling a stepper motor acting on the lateral guide of the cable.

In a variant implementation specific to cables having two conductor zones respectively constituted by a group of small-section conductors and by a group of larger-section conductors, the offset of the empty intermediate zone is measured by using the midplane of the group of smaller-section conductors as the reference plane.

According to another characteristic, the video system comprises in particular a camera associated with optical fiber lighting means.

In yet another variant implementation, the position of the reference plane is monitored over a stripped portion of the cable.

Under such circumstances, and preferably, the position of the reference plane is monitored while adjusting the cable longitudinally.

The method of the invention makes it possible to perform punching in complete safety without any risk of damaging the conductors, regardless of the dimensions and the positions thereof across the cable, so long as such positions remain within acceptable tolerances.

The method of the invention makes it possible to use as a reference for determining the optimum position for punching a plane that is immaterial in that it is not mechanically detectable. The punching tool is positioned as a function of the real locations of the conductors and not relative to an edge of the cable.

Punching produces reference orifices for subsequent connections of the cable, which orifices are thus located in positions that are optimal relative to the conductors, and take account of variations in margin and in spacing.

The method is implemented automatically and continuously, thereby making very high rates of throughput possible at a very satisfactory level of quality.

BRIEF DESCRIPTION OF THE DRAWINGS

The invention will be better understood on reading the following description and from the accompanying drawings, in which:

FIGS. 3A and 3B are section views through a cable on which the method of the invention has been applied;

FIG. 4 is a diagrammatic view of an embodiment of an installation used for implementing the method of the invention.

MORE DETAILED DESCRIPTION

Figure 1A:
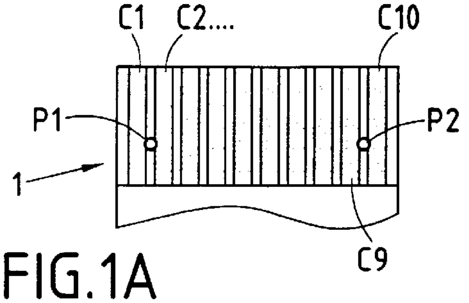
FIGS. 1A, 1B, and 1C are diagrams showing the successive steps in implementing traditional methods of the prior art.

The segment of flat cable 1 shown in plan view in FIG. 1A comprises at least one conductor zone C distributed over ten conductors C1 to C10 of identical dimensions. Provision is made for punching the cable on an axis P to provide at least one positioning orifice and preferably two positioning orifices of respective axes P1 and P2 in two intermediate empty zones situated respectively between the conductors C1 and C2, and between the conductors C9 and C10.

The axes P1 and P2 are assumed to coincide below with the orifices P1 and P2.

Providing the conductors are accurately positioned in this segment of cable, as is shown in FIG. 1A, then punching will take place solely through the empty zones, i.e. without damaging the adjacent conductors.

Figure 1B:
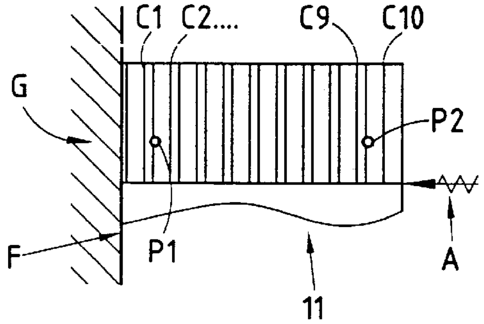

Unfortunately, it often happens that a flat cable, at least in certain segments such as a segment 11 shown in FIG. 1B, is of a configuration as shown where the left-hand margin is narrower than the right-hand margin. It can also happen that the total width of the cable and/or the sizes of the conductors C1 to C10 or the spacing between the conductors differ from the disposition shown in FIG. 1A.

This offsetting of the conductors C1 to C10 to the left that results from tolerances associated with cable manufacture is liable to cause the conductors C2 and C10 to be destroyed, at least in part, because the position of the punch tool has remained unchanged from its position shown in FIG. 1A.

The punch tool does not take account of the offset of the conductors since it is positioned solely relative to the fixed lateral guide G whose flank F is kept in contact in this case with the left-hand lateral edge of the cable under drive from resilient thrust means A mounted on the right-hand side of the cable in register with the flank F.

Figure 1C:
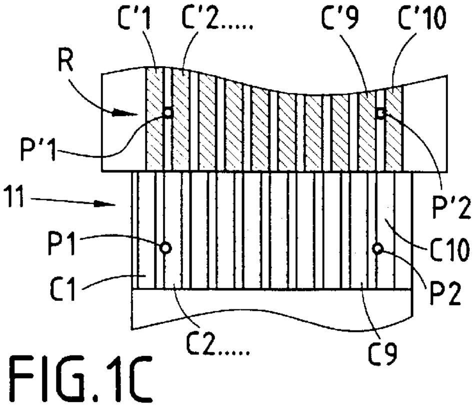

Such faulty punching can have consequences that are highly damaging on subsequent operations of automatically connecting the cable to an auxiliary member such as a printed circuit R, as shown in FIG. 1C.

The circuit R has conductor zones or tracks C1'–C10' and orifices or studs P1', P2' for aligning with the orifices P1, P2 that result from punching the segment 11 of flat cable shown in FIG. 1B for the purpose of performing an automatic soldering operation.

Because the conductors are offset to the left and because the studs P1', P2' are aligned with the orifices P1, P2, soldering will lead to the tricks C1' and C2' being short circuited via the conductor C2 and to the tracks C9' and C10' being short circuited via the conductor C10.

Figure 2A:
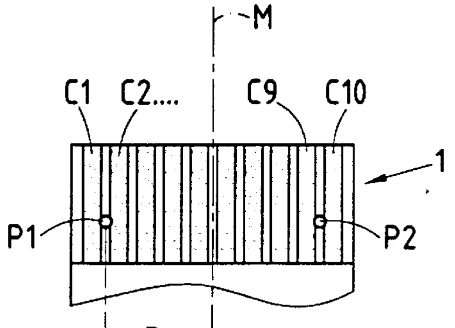
FIGS. 2A, 2B, 2C, and 2D are diagrams showing successive steps in implementing the method of the invention.

FIG. 2A is a plan view of a segment of cable 1 identical to that shown in FIG. 1A, i.e. a segment in which the conductors C1 to C10 are disposed in a manner that is perfectly symmetrical about the midplane of the cable 1 which, in this case, coincides with the midplane M of the group of conductors C1–C10 forming the conductor zone.

Punching takes place in the empty zones situated respectively between the conductors C1 and C2 and between the conductors C9 and C10, thereby producing orifices P1 and P2.

Each of the empty zones is thus defined between two adjacent conductor zones which for the empty zone P1 are the conductor zones C1 and C2–C10, and for the empty zone P2 are the conductor zones C1–C9, and C10.

The ideal distance Do between the midplane M used as the reference plane and the orifices P1 and P2 respectively is determined by a video system coupled to a computer. When the cable is perfect, as shown in FIGS. 1A and 2A, the calculated or measured value for this distance Do is taken as the reference value by the computer.

Thereafter, the cable 1 is caused to travel in contact with a lateral guide G that can move transversely while continuously measuring the position of the reference midplane M by means of the video system and while using the computer to determine the distance D between the plane M and the axes P1 or P2.

Figure 2B:
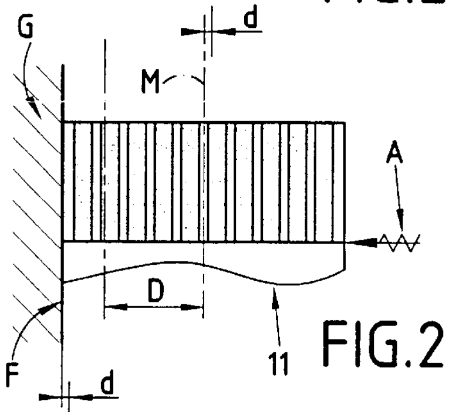

When, as shown in FIGS. 1B and 2B, the position of the plane M in a segment 11 of cable is offset to the left relative to the ideal position as shown in FIG. 2A, the distance D is different from the reference value Do. A comparison between D and Do gives the difference d.

This difference corresponds to the extent to which the empty zones are offset relative to the punch axes P1 and P2. The difference d is determined by the computer which then generates a signal that acts on the lateral guide G to move its lateral flank F automatically through a distance d to the right.

The effect of this adjustment is to cause the midplanes of the empty zones to coincide again with the punch axes P1 and P2.

Figure 2C:
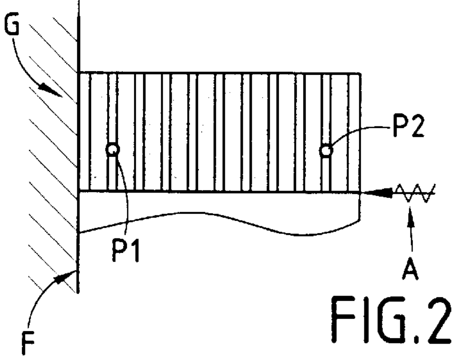

The following operation consists in punching while in this position, as shown in FIG. 2C.

Figure 2D:
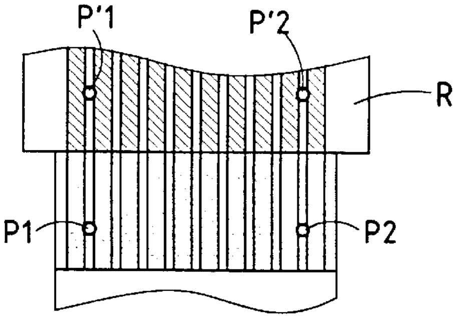

Thereafter, the cable is connected to an auxiliary member R after initially taking care to bring the studs P1', P2' of the member R into alignment with the orifices P1, P2 of the cable as shown in FIG. 2D.

The measurements previously performed of the offset thus serve to avoid any risk of a short circuit.

FIGS. 3A and 3B are section views through another cable 1 that has nine conductors. This cable has a first conductor zone constituted by a group of two large-section conductors C1 and C2, and by a second conductor zone constituted by seven smaller-section conductors C3–C9.

The selected reference plane is the midplane M of the second conductor zone C3–C9 and t he optimum position of the punch axis P for a perfect cable (FIG. 3A) is determined as a function thereof. This optimum position corresponds in this case to the midplane of the intermediate empty zone situated between the first and second conductor zones. Once this selection has been performed, the punch tool is locked in place on the axis P. The video system fitted with a camera and coupled to the computer then measures the width L of the second conductor zone C3–C9 and determines the position of its midplane M and also the distance Do between the midplane and the fixed axis P.

The distance Do is entered into the computer as a reference value. Thereafter, the cable 1 is caused to travel in contact with the flank F of the lateral guide G which can be moved transversely while continuously monitoring the position of the reference plane M relative to the axis P.

This position corresponds to a distance D which can vary over certain segments of the cable, in particular because of manufacturing tolerances relating to margins, thereby causing it to depart from the initial position.

Any variation in the distance D relative to the reference distance Do corresponds to the midplane of the intermediate empty zone being offset relative to the punch axis P (see FIG. 3B).

The computer continuously compares the value of D as observed by the video system with the reference value Do.

When the difference (D–Do) is not zero, the computer then determines the difference d and sends a control signal to the lateral guide G which co-operates with the resilient thrust means A to move the cable through a distance d in the opposite direction to the difference.

The effect of displacing the cable transversely in this way is to reset the midplane of the intermediate empty zone relative to the fixed plane P of the punch tool. In FIG. 3B, the distance D is greater than Do and the difference d is positive, so the stroke d of the lateral guide G to the left and the movement of the cable 1 in the same direction are controlled under drive from the bearing means A until the left lateral edge of the cable comes into contact with the flank F.

Where appropriate, when monitoring of the position of the reference plane M and calculation of D are performed on a zone of small area in which the conductors have been stripped, the longitudinal position of the cable is adjusted so as to center and set the optical field of the video system on the stripped zone. It is possible to select one of the edges of the stripped zone as the longitudinal reference.

FIG. 4 is a diagrammatic view of an installation enabling the method of the invention referred to as video-assisted punching to be implemented.

This installation comprises a set of rollers x for automatically and continuously transferring flat cable 1 between two storage reels X and Y.

The cable 1 coming from the reel X runs through a lateral guide G past a video camera V associated with optical fiber lighting means (not shown).

The guide G has a stepper motor T acting on the flank F that is to come into contact with the lateral edge of the cable 1 and that co-operates with resilient thrust means A placed facing it (see FIGS. 3A, 3B).

The punch tool P is mounted immediately downstream from the video system and thus operates on a cable that is accurately positioned.

The cable tensioning roller Z is placed downstream from the tool P so that the inspection and measurement operations and the punching operations are all performed on a cable that is completely flat. The method is tracked by a control station K fitted with a screen E. The camera V, the guide G, and the punch tool P are under the control of the computer S.

The control station K is disposed downstream from the tool P and is also fitted with video cameras U.

What is claimed is:

1. A method of punching a flat cable having at least one conductor zone defining laterally at least one intermediate empty zone whose midplane is designed to contain the fixed punch axis, wherein:

the cable is caused to pass flat through a lateral guide while using a video system coupled to a computer to monitor the position relative to the punch axis of a reference plane situated in the conductor zone, and it is compared with a reference value corresponding to the ideal position for said reference plane relative to the midplane of the intermediate empty zone so as to measure the offset of said zone relative to he punch axis;

thereafter the cable is displaced transversely and automatically through a distance corresponding to the offset as measured by the computer s as to cause the midplane of the empty zone to coincide with the punch axis; and then the cable is punched in this position.

2. A method according to claim 1, wherein the reference plane is selected as being the midplane of the conductor zone.

3. A method according to claim 1, wherein the cable is displaced transversely by controlling a stepper motor acting on the lateral guide of the cable.

4. A method according to claim 1, wherein, when the cable has two conductor zones respectively constituted by a group of smaller-section conductors and by a group of larger-section conductors, the offset of the intermediate empty zone is measured by taking as the reference plane the midplane of the group of smaller-section conductors.

5. A method according to claim 1, wherein the video system comprises in particular a camera associated with optical fiber lighting means.

6. A method according to claim 1, wherein the position of the reference plane is monitored over a stripped portion of the cable.

7. A method according to claim 1, wherein the position of the reference plane is monitored while adjusting the cable longitudinally.

* * * * *